United States Patent
Hiei

(10) Patent No.: US 6,568,622 B2
(45) Date of Patent: May 27, 2003

(54) ARMATURE WINDING APPARATUS

(75) Inventor: Takanori Hiei, Hadano (JP)

(73) Assignee: Odawara Engineering Company Limited, Ashigarakami Gun (JP)

(*) Notice: Subject to any disclaimer, the term of this patent is extended or adjusted under 35 U.S.C. 154(b) by 0 days.

(21) Appl. No.: 09/897,115

(22) Filed: Jul. 3, 2001

(65) Prior Publication Data

US 2002/0003185 A1 Jan. 10, 2002

(30) Foreign Application Priority Data

Jul. 4, 2000 (JP) .................................. 2000-202672

(51) Int. Cl.[7] .............................................. H02K 15/04
(52) U.S. Cl. ......................................................... 242/433.3
(58) Field of Search ................ 242/433.1, 433.3–433.4, 242/439; 29/596, 605

(56) References Cited

U.S. PATENT DOCUMENTS

| | | | | |
|---|---|---|---|---|
| 3,812,577 A | * | 5/1974 | Compton et al. | 242/433.3 |
| 3,927,456 A | * | 12/1975 | Dammar | 242/433.3 |
| 4,027,827 A | * | 6/1977 | Biddison | 242/433.3 |
| 4,052,783 A | * | 10/1977 | Shively | 242/433.3 |
| 5,100,071 A | * | 3/1992 | Hongo et al. | 242/433.3 |
| 5,794,884 A | * | 8/1998 | Dolgas et al. | 242/433.3 |
| 6,349,895 B1 | * | 2/2002 | Becherucci et al. | 242/433.3 |

FOREIGN PATENT DOCUMENTS

| | | | | |
|---|---|---|---|---|
| JP | 62122116 A | * | 6/1987 | H01F/41/06 |
| JP | 63-110936 | | 5/1988 | |
| JP | 7-15925 | | 1/1995 | |
| JP | 07015925 A | * | 1/1995 | H02K/15/09 |

* cited by examiner

*Primary Examiner*—Kathy Matecki
*Assistant Examiner*—Sang Kim
(74) *Attorney, Agent, or Firm*—Armstrong, Westerman & Hattori, LLP.

(57) ABSTRACT

A flyer shaft (12) having a first axis (A), and a wire guide holding member (24) having a second axis (B) eccentric therefrom by a distance (D) are synchronized to rotate in a same direction at a same speed, while an eccentric flange (26) supported around the fist axis (A) and the second axis (B), and a wire guide (30) integrated therewith are kept stationary, and after a wire (5) is inserted through a center hole (18a) of a push rod (18), which is formed in a center portion of the flyer shaft (12), and then passed through middle rollers (19, 20) and a top roller (21), it is guided by the wire guide (30) to be wound around an iron core (4) of an armature (1).

2 Claims, 3 Drawing Sheets

ARMATURE WINDING APPARATUS

BACKGROUND OF THE INVENTION

1. Field of the Invention

The present invention relates to an armature winding apparatus for forming a coil by winding a wire fed from a rotating flyer around an iron core of an armature held by a holding member.

2. Description of the Related Art

Conventionally, as a winding apparatus of this kind, there is one disclosed in JP, 7-15925, A according to the application of the present inventor.

This is an armature winding apparatus for guiding a wire fed from a rotating flyer to a winding portion of an armature iron core by a wire guide to form a coil, wherein the shaft line of a base end portion of a holding shaft for holding the wire guide is bent by a predetermined angle, a rotary member is rotatably provided on an outer circumferential portion of the bent portion, and the wire is inserted through a wire insertion passage provided at a position eccentric from an axis of the rotary member to be guided to the flyer.

Further, as shown in JP, 63-110936, A, a coil winding apparatus comprising a wire guide pipe attached to an outer circumferential portion eccentric from an axis of a rotary wheel integrated with a flyer support pipe to axially penetrate therethrough, and an inner wheel and an outer wheel mounted on the axis of the rotary wheel to be eccentric in a direction away from the wire guide pipe, is known.

However, in each of the conventional winding apparatuses as described above, the wire turns around the axis, at a position separated from the axis of the flyer to cut through the breeze during winding, thus causing the disadvantages of the wire being twisted or the surface coating peeling off while the wire is fed from the wire introduction port to the flyer of the apparatus. Further, in order to reduce such damages to the wire to some extent, it is necessary to provide a cover (nozzle) or the like for protecting the wire between the wire introduction port and the flyer.

Further, as the rotational speed of the flyer increases, the damage to the wire increases, and thus the rotational speed of the flyer cannot be increased.

The present invention is carried out in view of the above-described point, and its object is to provide an armature winding apparatus capable of preventing the damages to the wire caused by the occurrence of centrifugal force of the wire between the wire introduction port and the flyer.

SUMMARY OF THE INVENTION

To achieve the above object, the present invention provides an armature winding apparatus for guiding a wire fed from a rotating flyer to a winding portion of an armature iron core via a wire guide supported by a wire guide holding member to be relatively rotatable, wherein a wire insertion passage through which the wire can be inserted is formed in a shaft center portion of the aforementioned flyer.

In the above-described armature winding apparatus, the wire guide is supported around a first axis concentric with the flyer and around a second axis concentric with the wire guide holding member and parallel with the first axis with a predetermined space therefrom. Further, the flyer and the wire guide holding member are synchronized to rotate in the same direction at a same speed.

As a result that the armature winding apparatus according to the present invention is constituted as above, the wire is inserted through the shaft center portion of the flyer to be guided to the flyer, and therefore centrifugal force is not exerted on the wire as a result of the rotation of the flyer, thus eliminating the fears of the wire being twisted and the surface coating peeling off. Consequently, the rotation of the flyer can be increased, thus making it possible to increase productivity of the armature.

The above and other objects, features and advantages of the invention will be apparent from the following detailed description which is to be read in conjunction with the accompanying drawings.

DETAILED DESCRIPTION OF THE PREFERRED EMBODIMENT

Hereinafter, a preferred embodiment for carrying out the present invention will be described concretely based on the drawings.

Figure 1:
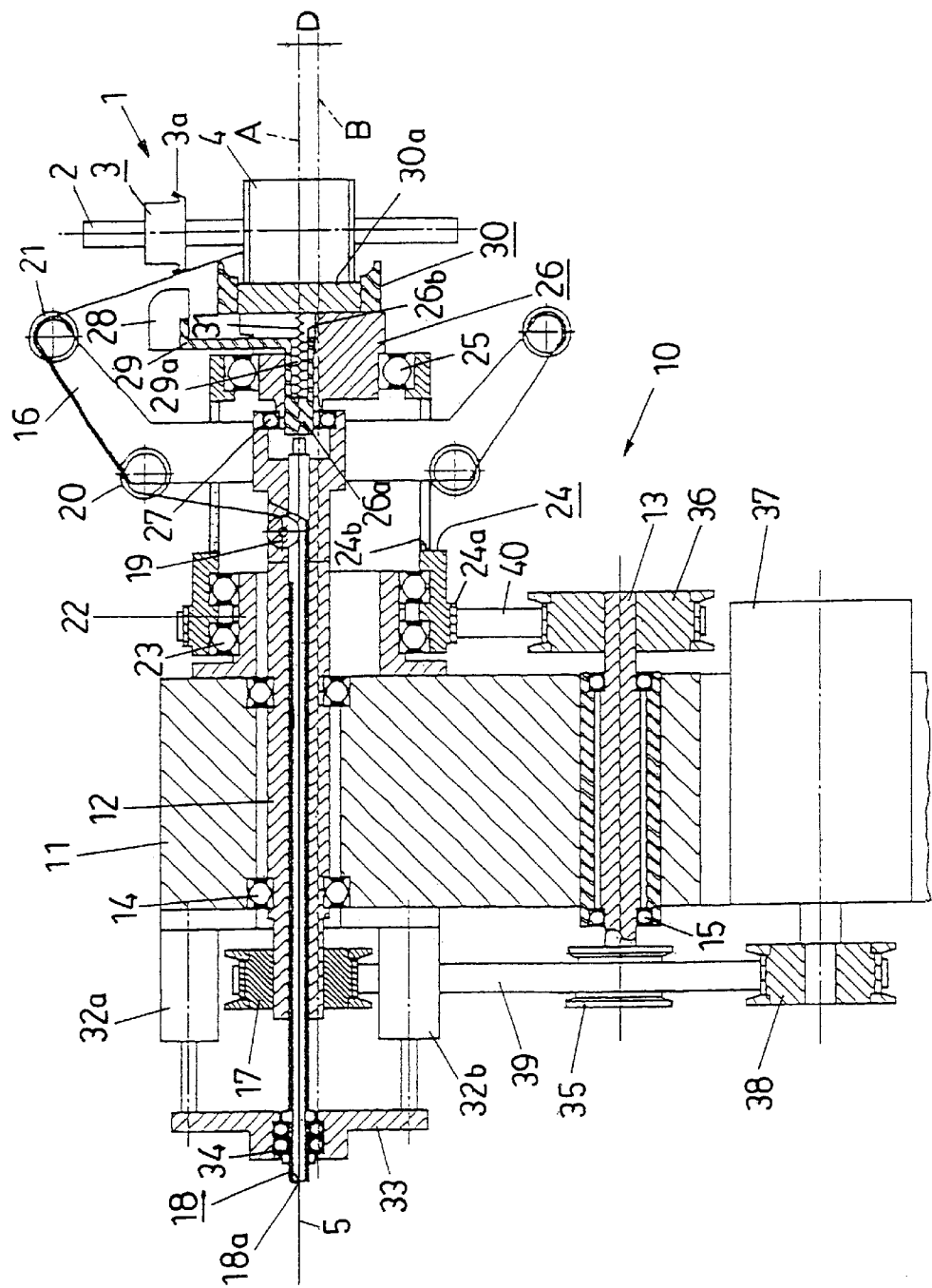
FIG. 1 is a longitudinal sectional view showing a structure according to an embodiment of the present invention.
Figure 2:
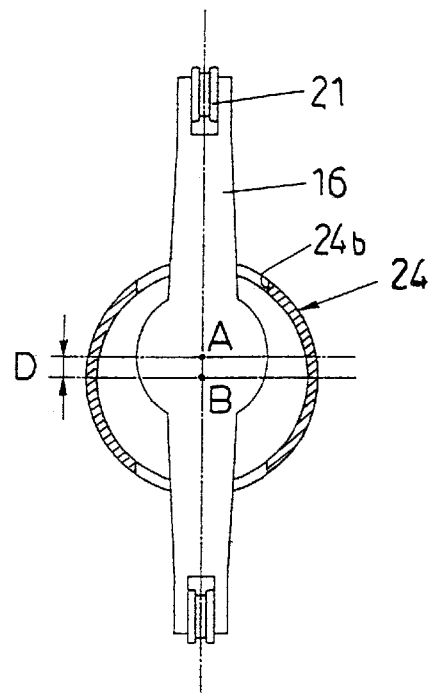
FIG. 2 is an explanatory view showing a first step of synchronized rotation of a flyer thereof and a wire guide holding member of the same embodiment.
Figure 3:
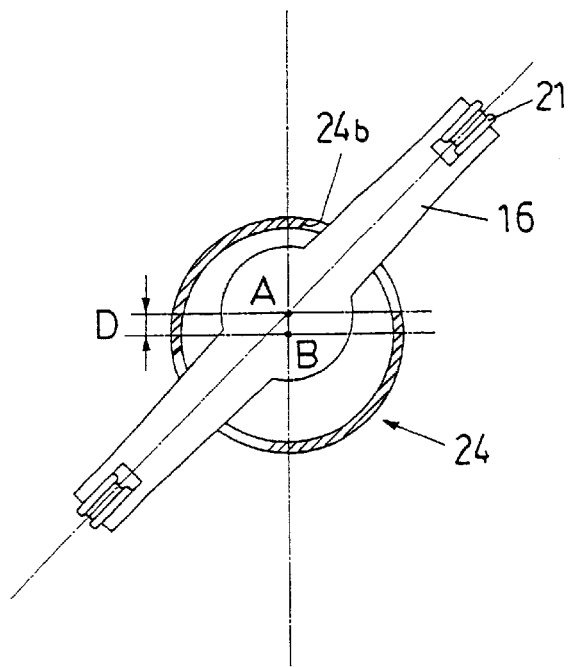
FIG. 3 is an explanatory view showing a second step of the same embodiment.
Figure 4:
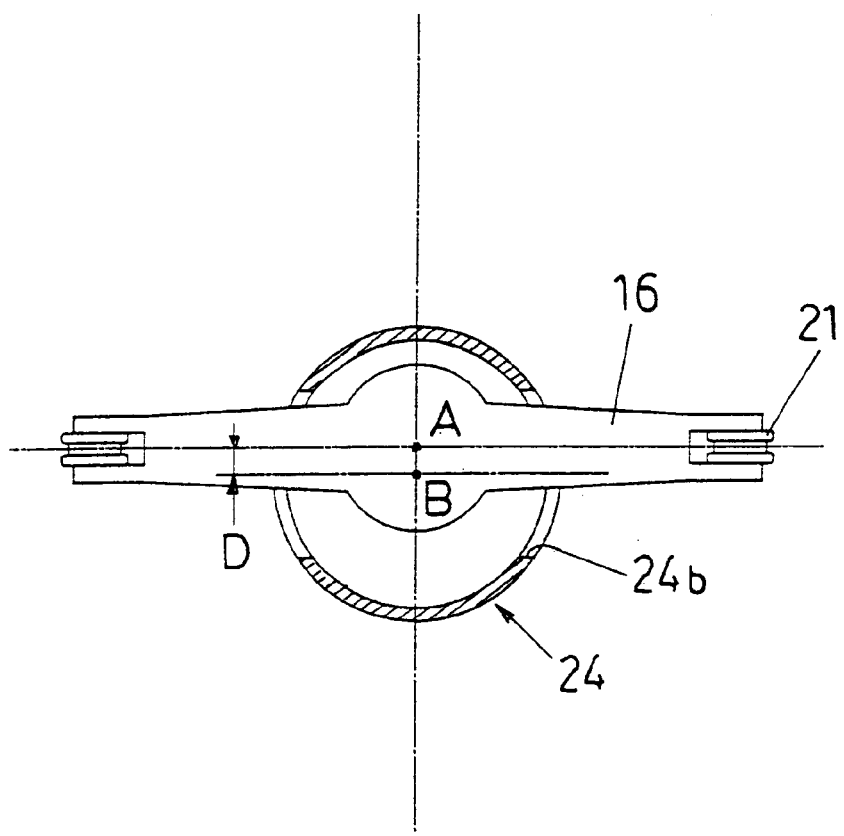
FIG. 4 is an explanatory view showing a third step of the same embodiment.

FIG. 1 is a longitudinal sectional view showing a structure according to an embodiment of the present invention, FIG. 2 to FIG. 4 are explanatory views each showing a state of synchronized rotation of a flyer thereof and a wire guide holding member.

In FIG. 1, an apparatus main body 11 of a winding apparatus 10 is mounted on a guide rail not shown to be movable leftward and rightward, and a flyer shaft 12 and a drive shaft 13 parallel in a left and right direction with a predetermined space to each other are rotatably supported by ball bearings 14 and 15 respectively at a lower and an upper portion of the apparatus main body 11. A flyer 16 is fixed to a front end portion (the right end portion in FIG. 1) of the flyer shaft 12, and a timing pulley 17 is fixed to a rear end portion (the left end portion in FIG. 1). A hollow push rod 18 is attached in a shaft center portion of the flyer shaft 12 to be slidable in an axial direction, and a center hole 18a of the push rod 18 is used as a wire insertion passage.

A middle roller 19 is rotatably provided in a notch portion in the front end side of the flyer shaft 12, and a middle roller 20 and a top roller 21 are rotatably provided at the flyer 16. A wire 5 is inserted from a rear end portion of the push rod 18 and guided to a winding portion of an armature 1 via the middle rollers 19, 20 and the top roller 21.

A cylindrical eccentric guide frame 22 having a second axis B parallel with and eccentric by a distance D from a first axis A concentric with the axis of the flyer shaft 12 is fixedly provided at a right side of the apparatus main body 11. A wire guide holding member 24 with a timing gear portion 24a being formed on an outer circumference thereof is rotatably mounted on an outer circumference of the eccentric guide frame 22 via a ball bearing 23. An opening 24b for inserting the flyer 16 through is opened in the wire guide holding member 24.

An eccentric flange 26 is rotatably mounted on an inner circumferential surface of the right end side of the wire guide holding member 24 via a ball bearing 25, an outer circumferential portion of an eccentric shaft 26a concentric with the first axis A is rotatably supported on an inner surface of a right end expanded opening portion of the flyer shaft 12 via a ball bearing 27. To a right end portion of the eccentric flange 26, integrally fixed is a wire guide 30 for guiding the wire 5 fed from the flyer 16 around the winding portion of the armature 1.

A through-hole 26b is formed in a region along the first axis A of the eccentric flange 26, and a shaft portion 29a of a tongue guide slider 29 integrated with a tongue guide 28 is mounted in the through-hole 26b to be slidable in an axial direction. The shaft portion 29a opposes a right end portion of the aforementioned push rod 18 with a very small space being provided between them, and the shaft portion 29a and the wire guide 30 have a compression spring 31 engagingly attached between them so that the tongue guide 28 is always biased leftward.

Further, a set of upper and lower tongue guide drive cylinders 32a and 32b are fixedly provided at the left side of the apparatus main body 11 so that axes thereof are parallel with the axis of the push rod 18, and a push rod drive member 33 is engagingly attached to the respective rod end portions to be relatively rotatable and synchronously movable in the axial direction with the push rod 18 via a ball bearing 34. Thus, the tongue guide drive cylinders 32a and 32b are operated in a contracting direction, whereby the tongue guide 28 is moved rightward against the bias force of the compression spring 31 via the push rod 18.

Further, timing pulleys 35 and 36 are fixed to both left and right ends of the drive shaft 13, and a timing pulley 38 is fixed to a rotating shaft of a drive motor 37 fixed to a lower portion of the apparatus main body 11. A timing belt 39 is provided between the timing pulleys 38, 35, and 17, and a timing belt 40 is provided between the timing pulley 36 and the timing gear portion 24a, respectively. By suitably selecting the number of teeth of timing pulleys 17, 35, 36, 38, and the timing gear portion 24a, the flyer shaft 12 and the wire guide holding member 24 are synchronized to be able to rotate in the same direction at the same rotational speed.

Meanwhile, the armature 1, around which the wire is wound, is held at an upper end portion of a shaft portion 2 by a collet chuck (not shown) capable of indexing rotation, and a known shield member (not shown) for covering a tongue 3a to be freely concealed and exposed, or the like is provided at an outer circumferential portion of a commutator 3. An iron core 4 with a plurality of slots being formed is fixedly provided at the shaft portion 2 with a predetermined space being provided from the commutator 3, and the wire 5 is fed from the rotating flyer 16 and guided by the wire guide 30 into a predetermined slot, whereby the coil is formed.

Next, the operation of the winding apparatus 10 constituted as above will be explained.

Initially, the apparatus main body 11 is advanced in the direction of the armature 1 to have a wire wound around, and after a concave portion 30a of the wire guide 30 is opposed to an outer circumferential surface of the iron core 4 with a very small space to an extent that the wire 5 does not fall therein being left between them, which is the state shown in FIG. 1, the drive motor 37 is started to synchronize the flyer shaft 12 and the wire guide holding member 24 as shown in FIG. 2 to FIG. 4 to rotate them in the same direction at the same speed, whereby the wire is wound around the winding portion of the iron core 4.

At this time, since the eccentric flange 26 is supported at the first axis A by the ball bearings 27 and also at the second axis B by the ball bearings 25, it cannot rotate, and the wire guide 30 integrated therewith is also kept stationary, thus making it possible to keep the wire guide 30 and the iron core 4 in a non-contact state. Consequently, wear of the wire guide 30 due to the contact with the iron core 4 is prevented, and indexing rotation of the armature 1 becomes possible without the position of the wire guide 30 being changed.

When the tongue 3a of the commutator 3 comes to a fixed position for hooking, the tongue guide 28 retreats the aforementioned shield member covering it, and operates the tongue guide drive cylinders 32a and 32b to advance the push rod 18 rightward against the bias force of the compression spring 31 to cover the above-described tongue 3a, whereby hooking operation is performed with reliability.

As described thus far, according to the armature winding apparatus according to the invention, the wire is guided through the center of the flyer shaft to the flyer, and therefore centrifugal force does not occur to the wire while the flyer is rotating, thus eliminating the fears of the wire being twisted and the surface coating peeling off. Accordingly, it becomes possible to increase the rotational speed of the flyer, and thus operation efficiency of the armature wire winding can be improved.

Further, since the outer circumferencial wall of the wire insertion passage provided in the shaft center portion of the flyer is used as the cover of the wire, it is not necessary to additionally provide a wire protection cover, thus making it possible to simplify the constitution of the winding apparatus.

In the above-described apparatus, as a result that the wire guide is constructed to be supported at the first axis and the second axis parallel therewith, the wire guide can be kept stationary even if the flyer rotates, thus making it possible to maintain the wire guide in a state not in contact with the armature iron core. Consequently, the fear of the wire guide being worn out in sliding contact with the armature iron core is eliminated, and it is not necessary to retreat the wire guide every time at the indexing rotation of the armature, thus making it possible to substantially increase productivity.

Further, as a result that the flyer and the wire guide holding member are synchronized to rotate in the same direction at the same speed, the interference of both of them with each other is prevented with a simple structure, thus making it possible to smoothly rotate the flyer at a high speed.

What is claimed is:

1. An armature winding apparatus for guiding a wire fed from a rotating flyer to a winding portion of an armature iron core via a wire guide supported by a wire guide holding member to be relatively rotatable, wherein a wire insertion passage through which the wire can be inserted is formed in a shaft center portion of said flyer, and wherein said wire guide is supported around a first axis concentric with said flyer and around a second axis concentric with said wire guide holding member and parallel with the first axis with a predetermined space therefrom.

2. An armature winding apparatus according to claim 1, wherein said flyer and said wire guide holding member are synchronized to rotate in a same direction at a same speed.

* * * * *